United States Patent
Auld et al.

(10) Patent No.: US 10,708,325 B2
(45) Date of Patent: Jul. 7, 2020

(54) SYSTEMS, METHODS, AND DEVICES FOR IMPLEMENTING DESTINATION AND SOURCE GROUPS

(71) Applicant: RGB Spectrum, Alameda, CA (US)

(72) Inventors: Lynton Auld, Rohnert Park, CA (US); Scott Norder, Oakland, CA (US); Raymond Ngai, Alameda, CA (US); Andrew Thompson, Los Gatos, CA (US)

(73) Assignee: RGB Spectrum, Alameda, CA (US)

( * ) Notice: Subject to any disclaimer, the term of this patent is extended or adjusted under 35 U.S.C. 154(b) by 393 days.

(21) Appl. No.: 15/616,775

(22) Filed: Jun. 7, 2017

(65) Prior Publication Data
US 2017/0359394 A1  Dec. 14, 2017

Related U.S. Application Data

(60) Provisional application No. 62/347,040, filed on Jun. 7, 2016.

(51) Int. Cl.
*H04L 29/06* (2006.01)
*H04L 29/08* (2006.01)
*H04L 29/14* (2006.01)

(52) U.S. Cl.
CPC ........ *H04L 65/4069* (2013.01); *H04L 65/607* (2013.01); *H04L 67/1002* (2013.01); *H04L 67/1034* (2013.01); *H04L 69/40* (2013.01)

(58) Field of Classification Search
CPC ............... H04L 65/4069; H04L 65/607; H04L 67/1002; H04L 67/1034; H04L 69/40
See application file for complete search history.

(56) References Cited

U.S. PATENT DOCUMENTS

| | | | |
|---|---|---|---|
| 7,953,883 B2 * | 5/2011 | Thomas | H04L 65/1069 709/231 |
| 8,453,163 B2 * | 5/2013 | Kothamasu | H04L 51/14 709/238 |
| 8,566,470 B2 | 10/2013 | Chen et al. | |
| 9,294,526 B2 | 3/2016 | George et al. | |
| 9,673,996 B1 * | 6/2017 | Upadhyay | H04L 12/56 |

(Continued)

*Primary Examiner* — Philip J Chea
*Assistant Examiner* — Robert B McAdams
(74) *Attorney, Agent, or Firm* — Kwan & Olynick LLP

(57) ABSTRACT

Systems, methods, and devices for implementing destination and source group-based routing are disclosed herein. Systems include transmitters configured to transmit media streams that are packetized streams of data. Each of the transmitters is implemented on one of a first plurality of physical nodes included in a first node cluster. The transmitters include encoders configured to generate the plurality of media streams. Systems include receivers configured to receive the media streams. Each of the receivers is implemented on one of a second plurality of physical nodes included in a second node cluster. The receivers include decoders configured to receive and decode the media streams. Systems include a controller configured to generate a first grouping for each node cluster based on node characteristics and cluster parameters, generate a second grouping for each node cluster based on grouping parameters, and route the media streams based on the first grouping and second grouping.

20 Claims, 6 Drawing Sheets

(56) References Cited

U.S. PATENT DOCUMENTS

2006/0248212 A1* 11/2006 Sherer ............... H04L 29/06027
709/231
2007/0140223 A1 6/2007 Bhatia et al.
2014/0136656 A1 5/2014 Martin De et al.

* cited by examiner

SYSTEMS, METHODS, AND DEVICES FOR IMPLEMENTING DESTINATION AND SOURCE GROUPS

CROSS-REFERENCE TO RELATED APPLICATIONS

This application claims the benefit under 35 U.S.C. § 119(e) of U.S. Provisional Patent Application No. 62/347,040, filed on Jun. 7, 2016, which is incorporated herein by reference in its entirety for all purposes

TECHNICAL FIELD

The present disclosure relates to the field of internet protocol (IP) networks, and more particularly to high-bandwidth digital content compliance over IP networks.

DESCRIPTION OF RELATED ART

Digital media content may include audio and visual information that may be rendered and displayed at display devices. Such digital media content may be transmitted over a communications network for display at a target display device. Accordingly, a transmitter may generate a media stream that is a stream or streams of data that represents the digital media content. The media stream may be transmitted over the communications network and may be provided to a display unit for display. While such digital media content may be transmitted over a communications network, traditional techniques are limited in their ability to implement commands on large numbers of transmitters and receivers, as well as efficiently utilize available resources to implement such commands.

SUMMARY

Various systems, methods, and devices for implementing destination and source group-based media stream routing are disclosed herein. Systems may include a plurality of transmitters configured to transmit a plurality of media streams, the plurality of media streams being packetized streams of data configured for network transmission, each of the plurality of transmitters being implemented on one of a first plurality of physical nodes included in a first node cluster, each of the transmitters including a plurality of encoders configured to generate and encode the plurality of media streams for transmission. The systems may also include a plurality of receivers configured to receive the plurality of media streams, each of the plurality of receivers being implemented on one of a second plurality of physical nodes included in a second node cluster, each of the plurality of receivers including a plurality of decoders configured to receive and decode the plurality of media streams for display at a display unit. The systems may further include a controller including one or more processors configured to generate a first grouping for each node cluster based on a plurality of node characteristics and a plurality of cluster parameters, generate a second grouping for each node cluster based on a plurality of grouping parameters, and route the plurality of media streams based on the first grouping and second grouping.

In various embodiments, each of the first node cluster and the second node cluster is configured to implement clustered failover protection and load balancing. In some embodiments, the systems further include at least one coordinator node configured to coordinate operations implemented by the plurality of encoders or the plurality of decoders. In various embodiments, the at least one coordinator node is communicatively coupled with the controller, and is configured to coordinate routing of the plurality of the media streams by propagating commands issued by the controller. In some embodiments, the controller is further configured to generate a plurality of routing commands based on the first grouping and the second grouping, the plurality of commands being used to route the plurality of media streams. In various embodiments, the systems also include a local machine configured to receive at least one input from a user, and provide the input to the controller, wherein the input includes one or more grouping parameters. In some embodiments, each of the plurality of media streams includes audio and visual data capable of being presented at a display unit to a user. In various embodiments, the display unit includes an arrangement of multiple display devices, wherein each of the display devices is configured to display one or more display windows, and wherein each display window is configured to display a media stream. In some embodiments, the display devices of the display unit are within line of sight of the same user.

Also disclosed herein are devices that may include a communications interface communicatively coupled with a first node cluster and a second node cluster via at least one communications network, the first node cluster including a plurality of transmitters configured to transmit a plurality of media streams, the plurality of media streams being packetized streams of data configured to network transmission, the second node cluster including a plurality of receivers configured to receive the plurality of media streams. Devices may further include a memory configured to store grouping parameters, node characteristics, and cluster parameters associated with the first node cluster and the second node cluster. The devices may also include one or more processors configured to generate a first grouping for each node cluster based on a plurality of node characteristics and a plurality of cluster parameters, generate a second grouping for each node cluster based on a plurality of grouping parameters, and route the plurality of media streams based on the first grouping and second grouping.

In various embodiments, each of the plurality of transmitters is implemented on one of a first plurality of physical nodes included in the first node cluster, and wherein each of the transmitters includes a plurality of encoders configured to generate and encode the plurality of media streams for transmission. In some embodiments, each of the plurality of receivers is implemented on one of a second plurality of physical nodes included in the second node cluster, wherein each of the plurality of receivers includes a plurality of decoders configured to receive and decode the plurality of media streams for display at a display unit. In various embodiments, the controller is further configured to generate a plurality of routing commands based on the first grouping and the second grouping, the plurality of commands being used to route the plurality of media streams. In some embodiments, each of the plurality of media streams includes audio and visual data capable of being presented at a display unit to a user. In various embodiments, the display unit includes an arrangement of multiple display devices, wherein each of the display devices is configured to display one or more display windows, and wherein each display window is configured to display a media stream.

Further disclosed herein are methods that may include, generating a first grouping for each of a plurality of node clusters based on a plurality of node characteristics and a plurality of cluster parameters, the plurality of node clusters including at least a first node cluster and a second node cluster, the first node cluster including a plurality of transmitters configured to transmit a plurality of media streams, the plurality of media streams being packetized streams of data configured to network transmission, the second node cluster including a plurality of receivers configured to receive the plurality of media streams. The methods may also include generating a second grouping for each of the plurality of node clusters based on a plurality of grouping parameters, and routing the plurality of media streams between the first node cluster and the second node cluster, the routing being implemented based, at least in part, on the first grouping and second grouping.

In various embodiments, the routing of the plurality of media streams further includes generating, using one or more processors of a controller, a plurality of routing commands based on the first grouping and the second grouping, and propagating at least some of the plurality of commands using a coordinator node. In some embodiments, the methods further include receiving at least one input from a user at a local machine, and providing the input to the controller, wherein the input includes one or more grouping parameters. In various embodiments, the methods further include displaying at least one of the routed plurality of media streams on a display device of a display unit. In some embodiments, the display unit includes an arrangement of multiple display devices, wherein each of the display devices is configured to display one or more display windows, and wherein each display window is configured to display a media stream.

DETAILED DESCRIPTION

Reference will now be made in detail to some specific examples of the invention including the best modes contemplated by the inventors for carrying out the invention. Examples of these specific embodiments are illustrated in the accompanying drawings. While the invention is described in conjunction with these specific embodiments, it will be understood that it is not intended to limit the invention to the described embodiments. On the contrary, it is intended to cover alternatives, modifications, and equivalents as may be included within the spirit and scope of the invention as defined by the appended claims.

As discussed above, conventional techniques remain limited in their ability to implement commands on large numbers of encoders and decoders, and in a manner that efficiently utilizes available cluster resources. Accordingly, such conventional techniques might not be able to implement switching and routing for large number of media streams when the routing of the media streams is desired at the same time and concurrently.

Various embodiments disclosed herein provide the ability to implement media stream routing based on a combination of a grouping generated at a cluster level, as well as a grouping that may be generated by a user or administrator. As will be discussed in greater detail below, such groupings may be applied to entities included in clusters which may be nodes, transmitters and receivers, as well as encoders and decoders. In this way, commands utilized to route media streams may be implemented on groups of transmitters and receivers as well as their respective encoders and decoders, in a manner that enables the efficient management of cluster resources as well as the efficient utilization of available resources to route the media streams between such transmitters and receivers. For example, as will be discussed in greater detail below, the combination of clustered-based grouping and a configurable parameter-based grouping may enable the implementation of configurable and user-defined groups of entities, such as encoders, decoders, and display windows in a manner that best utilizes available cluster resources. In this way, the implementation of such groupings may provide novel grouping functionalities with increased efficiency of cluster resource usage.

As will also be discussed in greater detail below, if multiple receivers are used to form a display wall that may include an array of display devices, the multiple receivers may be addressed as a single entity by other system components, such as a controller, and the implementation of routing of many media streams for such a display wall may be facilitated. In this way, the novel grouping techniques disclosed herein may provide novel grouping functionalities that may be applied to multiple display devices of a display wall presented to a particular user.

Figure 1:
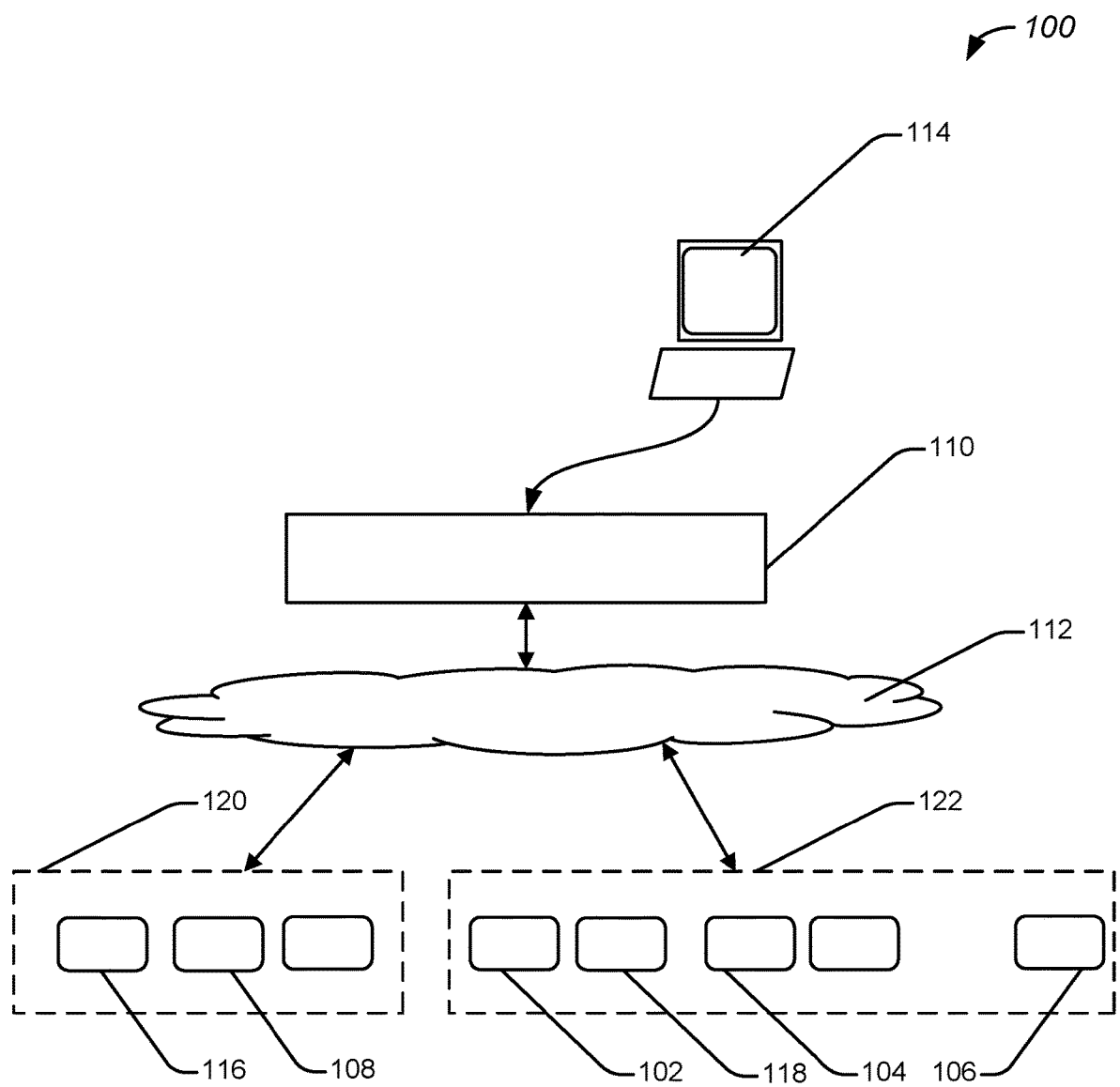
FIG. 1 illustrates an example of a system for media stream routing, implemented in accordance with some embodiments.

FIG. 1 illustrates an example of a system for media stream routing, implemented in accordance with some embodiments. As will be discussed in greater detail below, a system, such as system 100, may include various transmitters and receivers which may communicate via a communications network to transmit and receive media streams. Moreover, system 100 may further include a controller that may configure the transmitters and receivers as groups based on one or more grouping parameters. In various embodiments, the controller, as well as another system component such as a coordinator, may be further configured to utilize and select receivers and transmitters within the groups based on their characteristics and capabilities. As will be discussed in greater detail below, the utilization and selection of receivers and transmitters in this manner enables increased scalability of the system as well as the more efficient implementation of hardware resources.

Accordingly, system 100 may include various transmitters that may be configured to generate media streams. For example, the transmitters may be configured to encode media streams so that they may be generated and transmitted in a manner compliant with a content protection standard, such as high-bandwidth digital content. Accordingly a particular transmitter, such as transmitter 108, may include various ports or interfaces that are configured to receive media signals for transmission. As discussed above, such a media signal may include audio and video information.

Transmitter 108 may further include an encoder which may be configured to encode the received signal for transmission over a network, such as network 112 discussed in greater detail below. In various embodiments, the encoder included in transmitter 108 may be configured to implement the packetization of the received media content as well as the implementation of one or more content protection protocols. In this way, streams may be packetized for network transmission, and in a manner that is compliant with one or more content protection protocols.

It will be appreciated that a particular transmitter may include multiple encoders and may be configured to generate and transmit multiple media streams. In this way, transmitter 108 may include numerous encoders, and may be configured to receive multiple streams for encoding concurrently. Accordingly, transmitter 108 may be configured for various types of transmission, such as 1-1 transmission in which one stream is provided to one source. Transmitter 108 may also be configured for 1-M transmission in which one stream is provided to multiple sources simultaneously.

In various embodiments, system 100 may include multiple transmitters that may have various different transmission characteristics and capabilities. As discussed above, the transmitters may have different configurations of numbers of targets and numbers of media streams generated. Moreover, the transmitters may have different hardware and communications capabilities, such as interface types, supported communications formats and protocols, as well as available transmission speeds.

System 100 may further include various receivers that may be configured to receive media streams, and decode such media streams so that they may be displayed at display devices of a display unit. Accordingly, a receiver, such as receiver 102, may be configured to decode the media streams so that they may be displayed on the previously described display devices of display units. Moreover, receivers, such as receiver 102, may be configured to route the media streams to their appropriate destinations which may be target windows of display units. As shown in FIG. 1, there may be multiple different receivers that may have different capabilities. For example, receiver 102 may be associated with two display devices, while receiver 104 is associated with three display devices, and receiver 106 is associated with four display devices. In this way, system 100 may include multiple different types of receivers that have different configurations and display capabilities.

As will be discussed in greater detail below with reference to FIG. 4, FIG. 5, and FIG. 6, transmitters and receivers, such as transmitter 108 and receiver 102, may be implemented as nodes in clusters. For example, system 100 may include numerous clusters of nodes, such as first cluster 120 and second cluster 122 which may each include various nodes used to implement transmitters and receivers. Moreover, clusters may include coordinator nodes such as coordinator 116 and coordinator 118 that may each be transmitters or receivers that are configured to implement cluster-wide and group-wide coordination, as will be discussed in greater detail below. Accordingly, such nodes may be physical nodes that include the physical components of the transmitters and receivers. Moreover, the transmitters and receivers may be included in groups, which may be logical entities implemented on top of the physical nodes. Accordingly, the transmitters and receivers may be included in transmitter groups and receiver groups, and such groups may be used to form the basis of routing media streams from sources to destinations, and efficiently implementing one or more operations or commands on multiple transmitters and/or receivers and their respective encoders and decoders.

In various embodiments, system 100 may further include local machine 114 which may be communicatively coupled with controller 110. In various embodiments, local machine 114 may be configured to provide a graphical user interface that may be accessible by an entity, such as a user or administrator. In some embodiments, local machine 114 may be configured to receive an input from the entity and provide the input to the controller. As will be discussed in greater detail below, the input may identify one or more parameters as well as one or more operations to be implemented in system 100.

Figure 2:
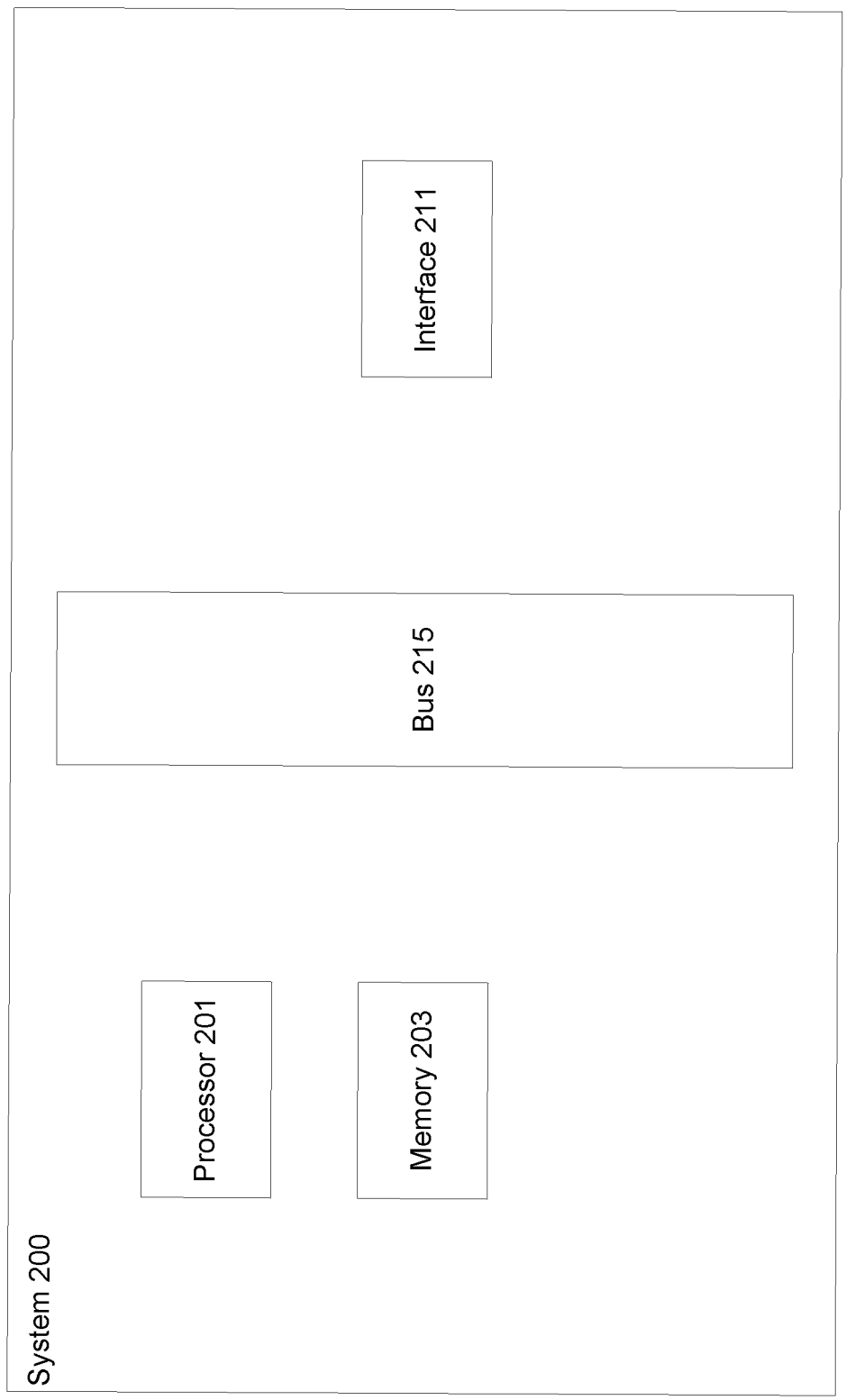
FIG. 2 illustrates one example of a processing system, configured in accordance with some embodiments.

FIG. 2 illustrates one example of a processing system, configured in accordance with some embodiments. According to particular embodiments, a system 200 suitable for implementing particular embodiments of the present invention includes a processor 201, a memory 203, an interface 211, and a bus 215 (e.g., a PCI bus or other interconnection fabric). In various embodiments, system 200 may be configured to operate as a controller. When acting under the control of appropriate software or firmware, the processor 201 is responsible for configuring and implementing groupings of transmitters and receivers, as discussed in greater detail below. Various specially configured devices can also be used in place of a processor 201 or in addition to processor 201. The interface 211 is typically configured to send and receive data packets or data segments over a network.

Particular examples of interfaces supported include Ethernet interfaces, frame relay interfaces, cable interfaces, DSL interfaces, token ring interfaces, and the like. In addition, various very high-speed interfaces may be provided such as fast Ethernet interfaces, Gigabit Ethernet interfaces, ATM interfaces, HSSI interfaces, POS interfaces, FDDI interfaces and the like. Generally, these interfaces may include ports appropriate for communication with the appropriate media. In some cases, they may also include an independent processor and, in some instances, volatile RAM. The independent processors may control communications-intensive tasks such as packet switching, media control and management.

According to various embodiments, the system 200 is a controller configured to configure and implement groupings of transmitters and receivers. For example, the system 200 may be configured as controller 110 shown in FIG. 1. In various embodiments, additional instances of system 200 may also be used to implement other components, such as a transmitter, a receiver, and/or a node that is a coordinator. More specifically, additional instances of system 200 may also be used to implement transmitter 108, receiver 102, coordinator 116, coordinator 118, and local machine 114 shown in FIG. 1. Although particular embodiments are described, it should be recognized that a variety of alternative configurations are possible.

Figure 3:
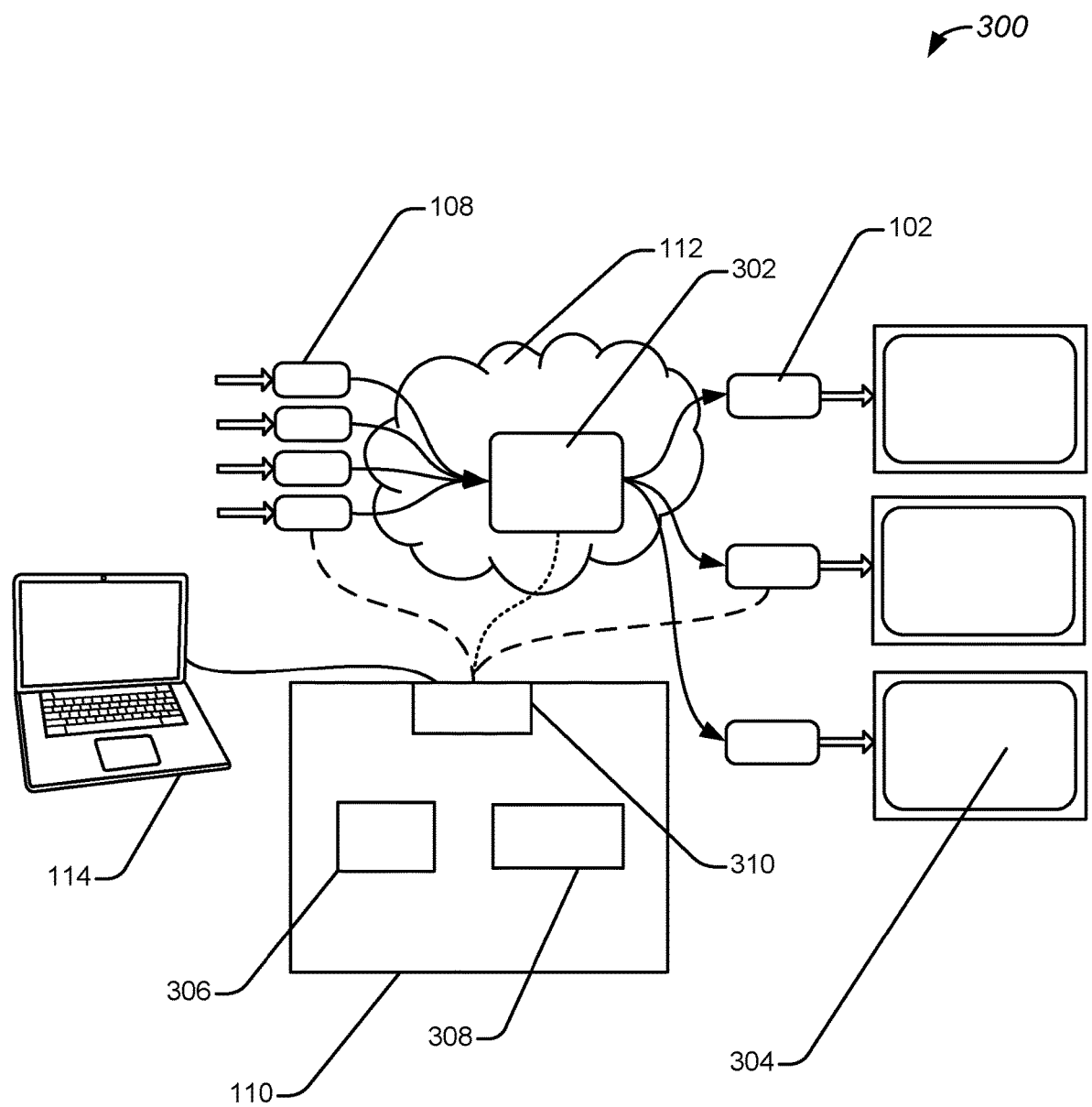
FIG. 3 illustrates an example of a system for media stream routing and display, implemented in accordance with some embodiments.

FIG. 3 illustrates an example of a system for media stream routing and display, implemented in accordance with some embodiments. As similarly discussed above with reference to FIG. 1, system 300 may include receivers such as receiver 102, and transmitters such as transmitter 108, that may communicate via network 112. Moreover, such receivers and transmitters may be coupled to controller 110, which may be coupled with local machine 114. In various embodiments, controller may include one or more components, such as processor 306, memory 308, and interface 310 which may be similar to processor 201, memory 203, and interface 211 discussed above. In some embodiments, network 112 may include various intermediary components, such as switch 302. Accordingly, FIG. 3 further illustrates how controller 110 may be communicatively coupled with receivers and transmitters, as well as intermediary components of network 112.

System 300 may further include various display units that may be configured to display one or more media streams. More specifically, display units, such as display unit 304, may be configured to display multiple presentations of media streams concurrently. Accordingly, display unit 304 may be configured to include multiple display devices that each display a media stream. For example, display unit 304 may include a combination of 2×2 display devices in which the four display devices, which may be monitors, are arranged as a matrix and viewable as a single combined display. In various embodiments, display unit 304 may include a M×N configuration of displays. For example, display unit 304 may include a 2×3 configuration, a 3×3 configuration, a 3×4 configuration, or a 4×4 configuration. In various embodiments, display windows may be used to present media streams, and such display windows may be displayed on the display devices. Moreover, more than one display window may be displayed on a particular display device. While some examples of configurations have been provided, any suitable configuration is contemplated and disclosed herein. As discussed above, the display devices in the configuration of display unit 304 may be concurrently viewable by a user.

In various embodiments, such display units may be configured to receive media streams and display such media streams on the previously described display devices. As discussed above, display unit 304 may be configured to implement the display of streams in windows which may or may not be coextensive with the display devices. For example, multiple streams may be displayed in a multiple windows on a single display device. Accordingly, as will be discussed in greater detail below, media streams may be associated with windows, and windows may be mapped to display devices of a display unit. In this way, display unit 304 may concurrently display multiple media streams. As will also be discussed in greater detail below, the utilization and selection of groups of receivers and transmitters to provide media streams to the display units may be implemented in a manner that enables increased scalability of the system as well as the more efficient implementation of hardware resources.

Figure 4:
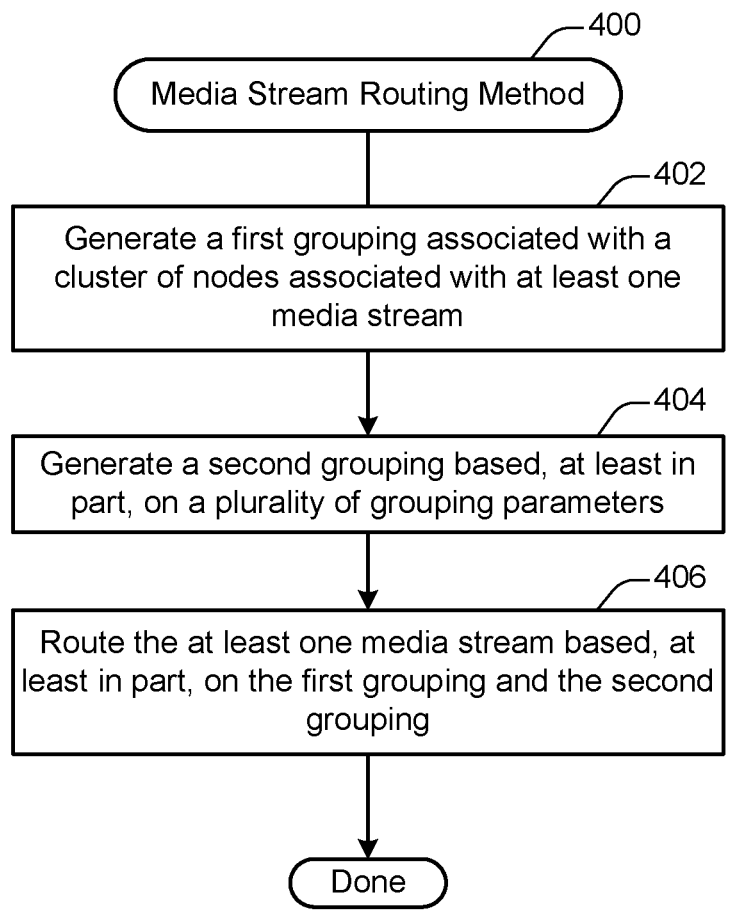
FIG. 4 illustrates a flow chart of an example of a method for determining groupings associated with encoders and decoders, implemented in accordance with some embodiments.

FIG. 4 illustrates a flow chart of an example of a method for determining groupings associated with encoders and decoders, implemented in accordance with some embodiments. As will be discussed in greater detail below, various groupings may be generated to facilitate the implementation of commands on various groups of transmitters and receivers as well as their respective encoders and decoders. Moreover, such groupings may further enable the efficient utilization of available resources to route media streams between such transmitters and receivers.

Accordingly, at 402, a first grouping may be generated based on characteristics of nodes included in a cluster. In various embodiments, the first grouping and cluster may be associated with at least one media stream. For example, as will be discussed in greater detail below, a cluster of nodes may be used to implement transmitters and/or receivers, and their respective encoders and/or decoders. Accordingly, such clusters may be used to implement the transmission and reception of media streams. In various embodiments, a first grouping may be generated by an entity, such as a controller, to group the members of the cluster based on their respective characteristics, such as available bandwidth and other performance capabilities.

At 404, a second grouping may be generated based, at least in part, on a plurality of grouping parameters. In various embodiments, the grouping parameters may be parameters that are received from an entity, such as a user or administrator. Accordingly, the second grouping may designate particular characteristics of members of a cluster, such as actions or uses of a particular node. Accordingly, a user may identify one or more desired parameters of a cluster, and such parameters may be provided to the cluster. As will be discussed in greater detail below with reference to FIG. 5, the controller may generate the second grouping based on the received parameters as well as the first grouping.

At 406, the at least one media stream may be routed based, at least in part, on the first grouping and the second grouping. Accordingly, a system component, such as a controller, may issue one or more commands to implement the transmission and reception of at least one media stream from one or more sources to one or more destinations. As will be discussed in greater detail below, the selection and utilization of the one or more sources and one or more destinations may be based on the first and second grouping. In this way, the generated groupings may enable the routing of media streams in a way that efficiently uses available cluster resources and enables the implementation of group-wide commands.

Figure 5:
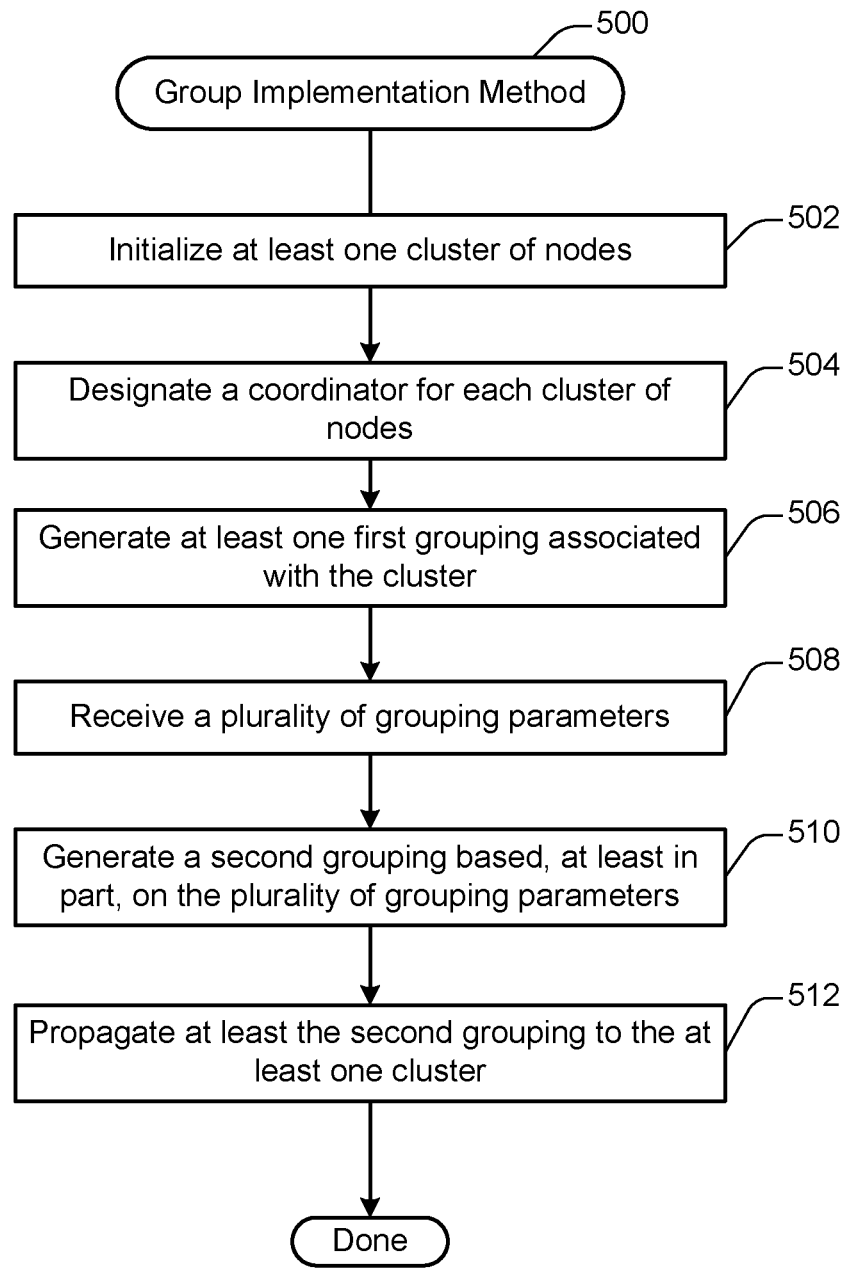
FIG. 5 illustrates a flow chart of another example of a method for determining groupings associated with encoders and decoders, implemented in accordance with some embodiments.

FIG. 5 illustrates a flow chart of another example of a method for determining groupings associated with encoders and decoders, implemented in accordance with some embodiments. As will be discussed in greater detail below, transmitters and receivers may be implemented as nodes, and various groupings associated with such transmitters and receivers may be generated to facilitate the implementation of commands, and route media streams between such transmitters and receivers.

At 502, at least one cluster of nodes may be initialized. As discussed above, transmitters and receivers that may include encoders and decoders respectively, may be implemented at physical nodes, and such nodes may be implemented in clusters that support various clustered functions such as failover protection and load balancing. As will be discussed in greater detail below, such failover protection and load balancing may be implemented specifically based on encoder and decoder utilization. Accordingly, the implementation of a cluster may be configured specifically based on the composition and utilization of encoders or decoders included in the cluster.

In various embodiments, a particular cluster may include a number of encoders or decoders. In this way, a particular cluster may be configured to handle encoding operations for media stream distribution, and another cluster may be configured to handle decoding operations for media stream distribution. It will be appreciated that many clusters may be implemented and initialized at 502. Accordingly, there may be several clusters initialized for each of encoding and decoding. In various embodiments, the population of clusters may be automatic, and may optionally provide manual override.

At 504, a coordinator may be designated. In various embodiments, a coordinator may be a particular node that handles the local implementation of the clustered operations described above. As will be discussed in greater detail below, a coordinator may also be configured to coordinate group operations associated with groups of encoders or decoders. The coordinator may also support various other functions, such as managing group presets. Such presets may include window, source, stream, routing and other information. The coordinator may also manage status information of groups and the cluster. In some embodiments, the coordinator may be randomly designated, or may be designated based on one or more characteristics or capabilities of the nodes. For example, the coordinator may be selected based on a particular amount of available processing capabilities or available storage space and bandwidth.

At 506, at least one first grouping may be generated. In various embodiments, the first grouping may be a grouping of members of the cluster based on their respective characteristics and capabilities. For example, a cluster of nodes may include several transmitters that may have various different transmission characteristics. In this example, the transmitters may have varying numbers of encoders, and various 1-M capabilities. More specifically, some transmitters may be capable of transmitting to one receiver, while some transmitters may be capable of transmitting to two receivers, and other transmitters may be capable of transmitting to four receivers. In this example, the transmitters may be grouped based on their identified transmission capabilities. In another example, the transmitters may have different bandwidth capabilities and different encoding capabilities which may also provide a basis for grouping. It will be appreciated that the first grouping may be generated based on multiple capabilities, such as a combination of 1-M capabilities and encoding capabilities. In various embodiments, groupings may also be determined based on geographic or topological characteristics. For example, groupings may be formed based on geographical locations, or locations within a network topology.

At 508, a plurality of grouping parameters may be received. In various embodiments, the grouping parameters may identify characteristics of transmitters and/or receivers as well as associated display units. According to some embodiments, grouping parameters may be uses or actions associated with nodes. In various embodiments, grouping parameters may be desired performance characteristics, such as bandwidth and encoding/decoding capabilities as well as one or more geographical characteristics, such as physical location of an associated display unit. Moreover, the parameters may identify characteristics of transmitters and/or receivers, as well as particular encoders and/or decoders included within them. Grouping parameters may also identify an access level or security setting associated with a group that may be configured to enable secure access to the members of the group. In some embodiments, grouping parameters may identify endpoint groups in which endpoints in the system are collected in a group. In some embodiments, such grouping parameters may be received from an entity such as an administrator. Accordingly, the grouping parameters may be provided to and received at the controller, and may form the basis of generating a second grouping, as discussed below.

At 510, a second grouping may be generated based, at least in part, on the received grouping parameters. Accordingly, the received parameters may be compared against features and characteristics of the members of the cluster that was initialized above, and matching entities may be assigned to each designated grouping. For example, if grouping parameters identify characteristics of encoders, such as a particular encoding compatibility as well as a particular 1-M capability, matching encoders may be identified and assigned to that group. In various embodiments, a controller may generate the second grouping based on such a comparison. Accordingly, the controller may map nodes or other cluster entities to a user-defined grouping, and may do so in an order or manner that is determined based on the first grouping discussed above. It will be appreciated that entities, such as encoders and decoders as well as their underlying nodes, may be assigned to more than one group. Accordingly, a particular encoder or decoder may be included in more than one secondary grouping.

At 512, at least the second grouping may be propagated throughout the cluster. Accordingly, the groupings that were generated may be stored in a data structure, such as a configuration file, which may be propagated to the members of the cluster such that each node stores a local copy of the groupings.

Figure 6:
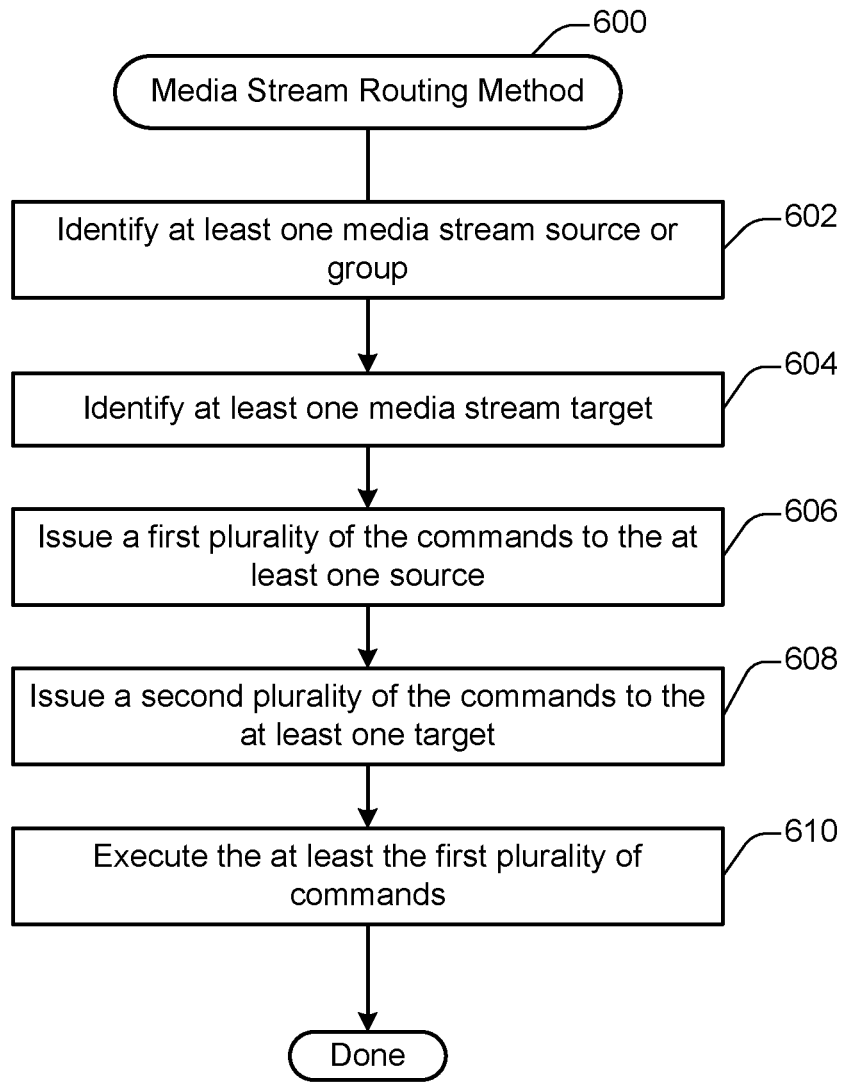
FIG. 6 illustrates a flow chart of an example of a method for routing media streams, implemented in accordance with some embodiments.

FIG. 6 illustrates a flow chart of an example of a method for routing media streams, implemented in accordance with some embodiments. As will be discussed in greater detail below, the above-described groupings may be used to identify sources and targets for media streams, as well as utilize such groupings to execute the routing of such media streams.

At operation 602, at least one media stream source or group may be identified. In various embodiments, the media stream source may be identified based on a request received at a component, such as a controller, in which a particular media stream or media content has been requested for display. The request may have been received from an entity, such as a user or administrator, or may have been received from a particular transmitter or display unit. In various embodiments, the controller may identify requested media content, and further identify a transmitter and encoder capable of transmitting the requested media content. In various embodiments, the identification of such an encoder may be implemented based on the first and second groupings discussed above. It will be appreciated that multiple sources may be identified during operation 602. Accordingly, several members of a group or an entire group may be identified at 602.

At operation 604, at least one media stream target or group may be identified. In various embodiments, the media stream target may be identified based on the request. In some embodiments, the media stream may have been requested by the target. Accordingly, the source of the request may provide the basis of the identification of the media stream target. As similarly discussed above, several targets may be identified during operation 604. More specifically, several or all members of a group of decoders/receivers may be identified during operation 604. Moreover, one or more display units and associated display windows may also be grouped. Accordingly, during operation 604, groups of display units or display windows may also be identified.

At operation 606, a first plurality of commands may be issued to the at least one source. Accordingly, an entity, such as a controller, may issue commands to the identified at least one source. In various embodiments, if several members of a group or an entire group has been identified, commands may be issued to the identified members of the group. In this way, group-wide commands may be issued and received at the appropriate nodes. In various embodiments, the commands may be issued to a local component, such as the coordinator, and the coordinator may propagate the commands to the identified members of the group. As will be discussed in greater detail below with reference to operation 610, such commands may be utilized to transmit the requested media content.

At operation 608, a second plurality of commands may be issued to the at least one target or destination. Accordingly, as similarly discussed above, an entity, such as a controller, may issue commands to the identified at least one target destination. As also discussed above, if several members of a group or an entire group has been identified, commands may be issued to the identified members of the group, and group-wide commands may be issued and received at the appropriate nodes. As similarly discussed above, the commands may be issued to a local component, such as the coordinator, and the coordinator may propagate the commands to the identified members of the group. In various embodiments, the second plurality of commands may configured the target receivers to initialize preparation for reception of the requested media stream.

At operation 610, at least the first plurality of commands may be executed. Accordingly, at operation 610, the identified sources may execute one or more commands to initiate transmission of the media stream to the target destination. For example, a particular receiver may retrieve the identified media content, encode and packetize the media content for transmission, and proceed to initiate the media stream transmission to an identified target destination. In various embodiments, operation 610 may include the routing of media streams from a group of sources to a group of destinations. For example, media streams may be routed from a group of encoders to a group of decoders. In such an example, a best effort routing technique may be implemented. More specifically a stream of a first encoder may be routed to a first decoder, and a stream of a second encoder may be routed to a second decoder, etc. Such routing may be configured and implemented until no more encoders or decoders are available.

In the foregoing specification, the invention has been described with reference to specific embodiments. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of invention.

What is claimed is:

1. A system comprising:
    a plurality of transmitters configured to transmit a plurality of media streams, the plurality of media streams being packetized streams of data configured for network transmission, each of the plurality of transmitters being implemented on one of a first plurality of physical nodes included in a first node cluster, each of the transmitters comprising a plurality of encoders configured to generate and encode the plurality of media streams for transmission;
    a plurality of receivers configured to receive the plurality of media streams, each of the plurality of receivers being implemented on one of a second plurality of physical nodes included in a second node cluster, each of the plurality of receivers comprising a plurality of decoders configured to receive and decode the plurality of media streams for display at a display unit; and
    a controller communicatively coupled to the plurality of transmitters and the plurality of receivers, the controller comprising one or more processors configured to:
        generate a first grouping for each node cluster based on a plurality of node characteristics and a plurality of cluster parameters;
        generate a second grouping for each node cluster based on a plurality of grouping parameters; and
        route the plurality of media streams based on the first grouping and second grouping.

2. The system of claim 1, wherein each of the first node cluster and the second node cluster is configured to implement clustered failover protection and load balancing.

3. The system of claim 2 further comprising:
    at least one coordinator node configured to coordinate operations implemented by the plurality of encoders or the plurality of decoders.

4. The system of claim 3, wherein the at least one coordinator node is communicatively coupled with the controller, and is configured to coordinate routing of the plurality of the media streams by propagating commands issued by the controller.

5. The system of claim 1, wherein the controller is further configured to generate a plurality of routing commands based on the first grouping and the second grouping, the plurality of commands being used to route the plurality of media streams.

6. The system of claim 1 further comprising:
    a local machine configured to receive at least one input from a user, and provide the input to the controller, wherein the input includes one or more grouping parameters.

7. The system of claim 1, wherein each of the plurality of media streams includes audio and visual data capable of being presented at a display unit to a user.

8. The system of claim 7, wherein the display unit comprises an arrangement of multiple display devices, wherein each of the display devices is configured to display one or more display windows, and wherein each display window is configured to display a media stream.

9. The system of claim 8, wherein the display devices of the display unit are within line of sight of the same user.

10. A device comprising:
    a communications interface communicatively coupled with a first node cluster and a second node cluster via at least one communications network, the first node cluster comprising a plurality of transmitters configured to transmit a plurality of media streams, the plurality of media streams being packetized streams of data configured for network transmission, the second node cluster comprising a plurality of receivers configured to receive the plurality of media streams;
    a memory configured to store grouping parameters, node characteristics, and cluster parameters associated with the first node cluster and the second node cluster;
    one or more processors configured to:
        generate a first grouping for each node cluster based on a plurality of node characteristics and a plurality of cluster parameters;
        generate a second grouping for each node cluster based on a plurality of grouping parameters; and
        route the plurality of media streams based on the first grouping and second grouping.

11. The device of claim 10, wherein each of the plurality of transmitters is implemented on one of a first plurality of physical nodes included in the first node cluster, and wherein each of the transmitters comprises a plurality of encoders configured to generate and encode the plurality of media streams for transmission.

12. The device of claim 11, wherein each of the plurality of receivers is implemented on one of a second plurality of physical nodes included in the second node cluster, wherein each of the plurality of receivers comprises a plurality of decoders configured to receive and decode the plurality of media streams for display at a display unit.

13. The device of claim 10, wherein the controller is further configured to generate a plurality of routing commands based on the first grouping and the second grouping, the plurality of commands being used to route the plurality of media streams.

14. The device of claim 10, wherein each of the plurality of media streams includes audio and visual data capable of being presented at a display unit to a user.

15. The device of claim 14, wherein the display unit comprises an arrangement of multiple display devices, wherein each of the display devices is configured to display one or more display windows, and wherein each display window is configured to display a media stream.

16. A method comprising:
generating, using one or more processors of a controller, a first grouping for each of a plurality of node clusters based on a plurality of node characteristics and a plurality of cluster parameters, the plurality of node clusters comprising at least a first node cluster and a second node cluster, the first node cluster comprising a plurality of transmitters configured to transmit a plurality of media streams, the plurality of media streams being packetized streams of data configured for network transmission, the second node cluster comprising a plurality of receivers configured to receive the plurality of media streams;
generating, using one or more processors of the controller, a second grouping for each of the plurality of node clusters based on a plurality of grouping parameters; and
routing, using one or more processors of the controller, the plurality of media streams between the first node cluster and the second node cluster, the routing being implemented based, at least in part, on the first grouping and second grouping.

17. The method of claim 16, wherein the routing of the plurality of media streams further comprises:
generating, using one or more processors of a controller, a plurality of routing commands based on the first grouping and the second grouping; and
propagating at least some of the plurality of commands using a coordinator node.

18. The method of claim 16 further comprising:
receiving at least one input from a user at a local machine; and
providing the input to the controller, wherein the input includes one or more grouping parameters.

19. The method of claim 16 further comprising:
displaying at least one of the routed plurality of media streams on a display device of a display unit.

20. The method of claim 19, wherein the display unit comprises an arrangement of multiple display devices, wherein each of the display devices is configured to display one or more display windows, and wherein each display window is configured to display a media stream.

* * * * *